United States Patent [19]
Bertetti

[11] Patent Number: 6,095,617
[45] Date of Patent: Aug. 1, 2000

[54] INTEGRATED WHEEL AND WHEEL HUB ASSEMBLY, PARTICULARLY FOR A VEHICLE

[75] Inventor: Paolo Bertetti, Turin, Italy

[73] Assignee: SKF Industrie S.p.A., Turin, Italy

[21] Appl. No.: 09/039,858

[22] Filed: Mar. 16, 1998

[30] Foreign Application Priority Data

Mar. 18, 1997 [IT] Italy ................................ TO97A0231

[51] Int. Cl.[7] .............................. B60B 19/00; B60C 5/16
[52] U.S. Cl. ...................... 301/6.8; 301/12.1; 301/105.1; 301/112; 152/396
[58] Field of Search ..................................... 301/9.1, 10.1, 301/11.1, 12.1, 35.54, 36.62, 6.1, 6.8, 105.1, 35.53, 35.61, 111, 112; 152/396; 29/894, 321, 273

[56] References Cited

U.S. PATENT DOCUMENTS

| 1,743,644 | 1/1930 | White .................................. 29/894.321 |
| 1,797,304 | 3/1931 | Waterbor ............................... 301/12.1 |
| 2,162,696 | 6/1939 | Burger ................................... 301/12.1 |
| 2,251,538 | 8/1941 | Ash ......................................... 301/6.1 |
| 2,254,198 | 9/1941 | Ash ......................................... 301/5.1 |
| 2,410,573 | 11/1946 | Eksergian ............................. 301/11.1 |
| 2,427,378 | 9/1947 | Ash .......................................... 301/6.1 |
| 3,597,000 | 8/1971 | Klaue ...................................... 301/6.1 |
| 5,772,285 | 6/1998 | Bigley et al. ........................... 301/6.8 |

FOREIGN PATENT DOCUMENTS

| 4027355 | 3/1991 | Germany ............................... 301/9.1 |
| 8044 | 4/1910 | United Kingdom ................ 301/11.1 |
| 2132572 | 7/1984 | United Kingdom ................ 301/11.1 |

*Primary Examiner*—S. Joseph Morano
*Assistant Examiner*—Long B. Nguyen
*Attorney, Agent, or Firm*—Merchant & Gould P.C.

[57] ABSTRACT

Integrated wheel and wheel hub assembly for a vehicle, including a wheel hub (3), a wheel (2), carried by the wheel hub (3), a suspension mount (5) to connect the wheel hub (3) to the vehicle body, a rolling bearing, interposed between the wheel hub (3) and the suspension mount (5), and a brake rotor (39). The wheel includes a a rim (10) for the insertion of a tire (11) and a wheel flange (13), substantially radial, to connect the rim (10) with the wheel hub (3), the empty wheel flange (13) being prepared as an independent component, both of the rim (10) and of the wheel hub (3), and being connected solidly axially and angularly and in a secured manner to the wheel huo (3), and being connectable in a removable way to the rim (10).

9 Claims, 2 Drawing Sheets

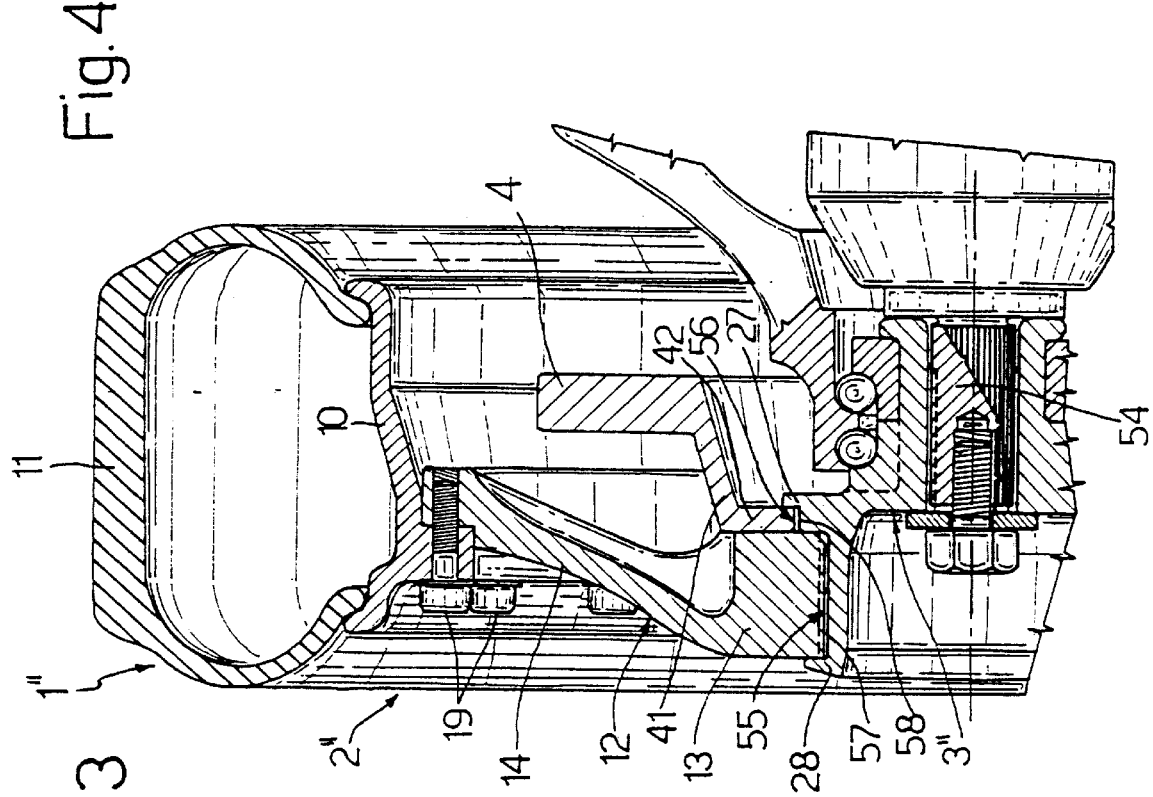
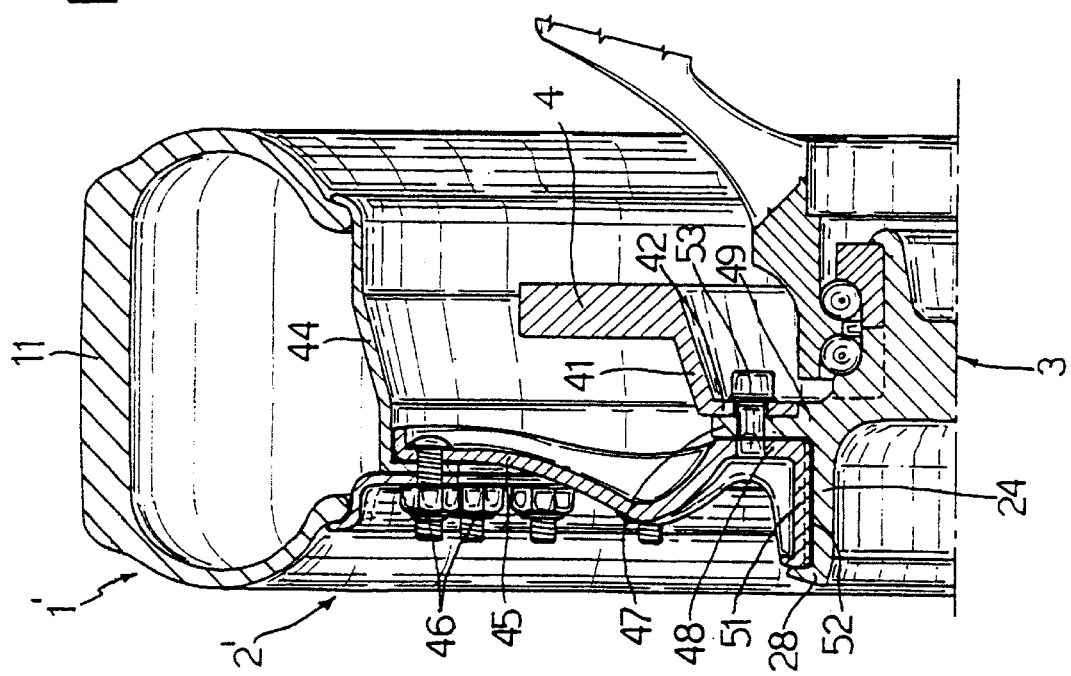

6,095,617

INTEGRATED WHEEL AND WHEEL HUB ASSEMBLY, PARTICULARLY FOR A VEHICLE

FIELD OF THE INVENTION

The present invention relates to an integrated wheel and wheel hub assembly, particularly for a vehicle.

BACKGROUND OF THE INVENTION

As is known, wheel hubs in vehicles are coupled in a non permanent way to the wheel and rotor element of the brake, using screws or nuts. Moreover, in these vehicles, the wheel flange (or the section of the wheel that connects the rim-tire assembly to the wheel hub) and the rim are manufactured by way of a single piece of sheet steel or light alloy.

Consequently, wheel dismantling, to replace the tire, for instance, requires the separation of the wheel flange from the wheel hub, by the removal of the appropriate tightening screws.

In the same but opposite way, wheel mounting on the hub requires the tightening of these screws, generating efforts that can cause adjacent parts, and, in particular, the brake rotor, to be deformed. The latter can therefore be less efficient and be subjected to faster wearing or to vibrations.

Another solution is available for secured axle industrial vehicles, in which the rim is manufactured as a separate element from the flange, which is obtained as an integral component of the wheel hub assembly, and which constitutes the section in which the external ring of the rolling bearing is mounted.

Solutions described present some disadvantages. Firstly, and in particular, added to the possible deformation of the brake rotor, the user may find it difficult to remove and replace the tire, in the event of a hole. Secondly, the weight and cost of the wheel hub assembly become too high for automobile purposes.

SUMMARY OF THE INVENTION

It is an object of the present invention to provide an integrated wheel and wheel hub assembly that makes it possible to eliminate above mentioned disadvantages and, more particularly, is both simple and inexpensive to produce.

According to this invention, an integrated wheel and wheel hub assembly is produced for one vehicle, both for idler wheels and for driving wheels, including a wheel hub, a wheel carried by this wheel hub, a suspension mount to connect the integrated assembly to the vehicle body, a rolling bearing interposed between the wheel hub and the above mentioned suspension mount, and a brake rotor; the wheel including a rim for the insertion of a tire and a substantially radial wheel flange to connect the rim and the wheel hub, characterized by the fact that:
  the wheel flange is produced as an independent component both of the rim and of the wheel hub;
  it is solidly connected, axially and angularly, and in a secured manner, to the wheel hub; and
  it can be connected to the rim in a removable way.

In order that the present invention may be well understood there will now be described, for example but not limiting purposes, a few of the most preferred embodiments, reference being made to the accompanying drawings, in which:

FIG. 3 is an elevational view like FIG. 1, of a second embodiment of the assembly object of the present invention;

FIG. 4 is an elevational view like FIG. 1, of a third embodiment of the assembly object of the present invention.

DETAILED DESCRIPTION OF THE INVENTION

Figure 1:
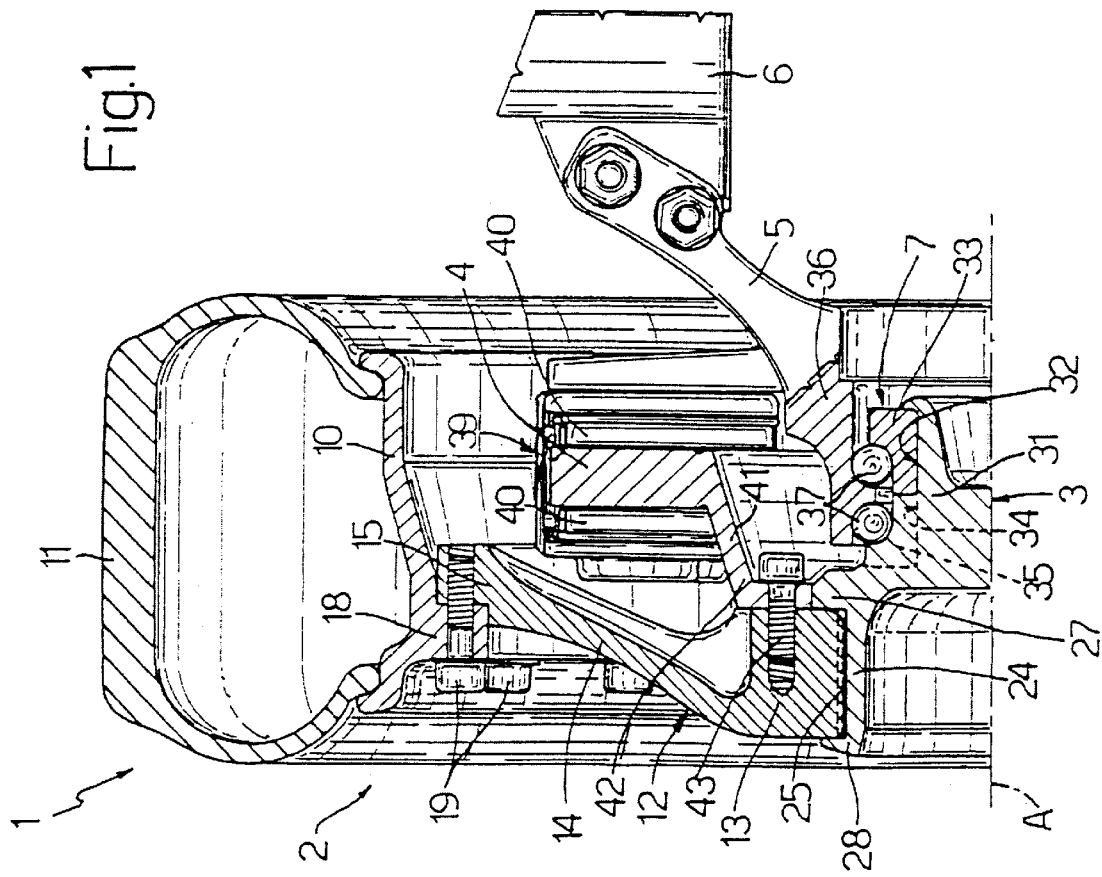
FIG. 1 is an elevational view, sectioned according to a transversal view of the vehicle, of the first embodiment of the integrated wheel and wheel hub assembly object of the invention.

Referring to FIG. 1, wherein the numeral 1 is used to designate an integrated wheel and wheel hub assembly, complete, that can be used for connection to a vehicle (not illustrated for purposes of simplicity), wheel 2, illustrated as a non-driving wheel; only the half section of assembly 1 is represented given the symmetrical design of the assembly, with respect to wheel axis 2, designated with A. Assembly 1 includes, added to wheel 2, hub wheel 3, idle, brake rotor 4 as part of brake assembly 39, conventional, mount 5 of suspension 6, conventional, and rolling bearing 7 to connect in a rotary way wheel hub 3 to mount 5.

Wheel 2 includes rim, defined by an annular gear with axis A as the symmetry axis, tire 11, carried by rim 10, and wheel flange 12, connected rim 10 to wheel hub 3; the wheel flange 12 is substantially radial and symmetrical with respect to axis A, and, according to the first aspect of the invention, is prepared as an independent element of rim 10. Referring to the figures, and to the example illustrated in FIG. 1, because they are prepared as separate means, rim 10 and wheel flange 12 can be prepared with or without identical materials; in particular, flange 12 illustrated in FIG. 1 is made, either by fusion or stamping, of a light alloy. Referring to the figures, and to the example illustrated in FIG. 2, flange 12 is substantially star-shaped, and presents an annular central section, 12, three rays, indicated by 14, placed at a distance of 120° of the other, and an external annular gear (more clearly indicated in FIG. 1) coaxial to axis A and integral to the ends of the rays, 14. Rim 10 (that, as described above, can be made in light alloy or sheet steel) includes an annular radial flange, 18, to which is secured with screws 19 to annular gear 15. It is clear that, according to an embodiment that is not illustrated here, gear 15 can also be missing and rim 10 can be secured on the rays 14, directly.

Hub 3 presents cylindrical section 24 (cup-shaped). Central section 13 of wheel flange 12 is mounted on this section, via slotted or rotary coupling 25, or via an interference coupling (not illustrated). Section 24 of hub 3 also includes annular projection 27, defining the first shoulder of axial arrest for central section 13. Annular axial end 28 of the cup-shaped body is bent by rolling on a border of central section 13 opposite to the stopping border on projection 27, creating a second axial arrest that, together with the first, ensures the axial block of wheel flange 12. According to another embodiment of the present invention, not illustrated here, the radial and axial coupling between wheel flange 12 and wheel hub 13 can be obtained with a welding cord on both the peripheral contact borders of central section, and cup-shaped section 24.

Wheel hub 3 also presents as an opposite band of end 28 with respect to projection 27, cylindrical section 31 with a diameter inferior to the external diameter of cup-shaped section 24; an internal track of bearing 7 and seat 32 are found on cylindrical section 31, which houses annular semi-element 33, with a second internal track of bearing 7.

According to the second embodiment of the present intention, illustrated by a dotted line, cylindrical section 31 can present seat 34 of larger dimensions than seat 32, that, other than semi-element 33, also houses additional semi-element 35, that includes the first track, instead of cylindrical section 31.

Bearing 7 includes, other than the internal tracks defined above, external ring 36, that includes two corresponding external rolling tracks, for corresponding friction body crowns 37, engaged in the sad tracks and the internal tracks; in the illustrated unlimiting representation, ring 36 is integral with mounting section 5 of suspension 6, but can, in general, simply be connected to the latter, in a dismountable or secured way.

Brake group 39, in this case a disc brake, includes rotor brake 4, defined by a coaxial disc on axis A, integral with wheel 2, and braking member 40, defined by a clip-type member, integral with mounting section 5 (in known way, not illustrated for purposes of simplicity) and designed to operate in known way with disc 4.

Figure 2:
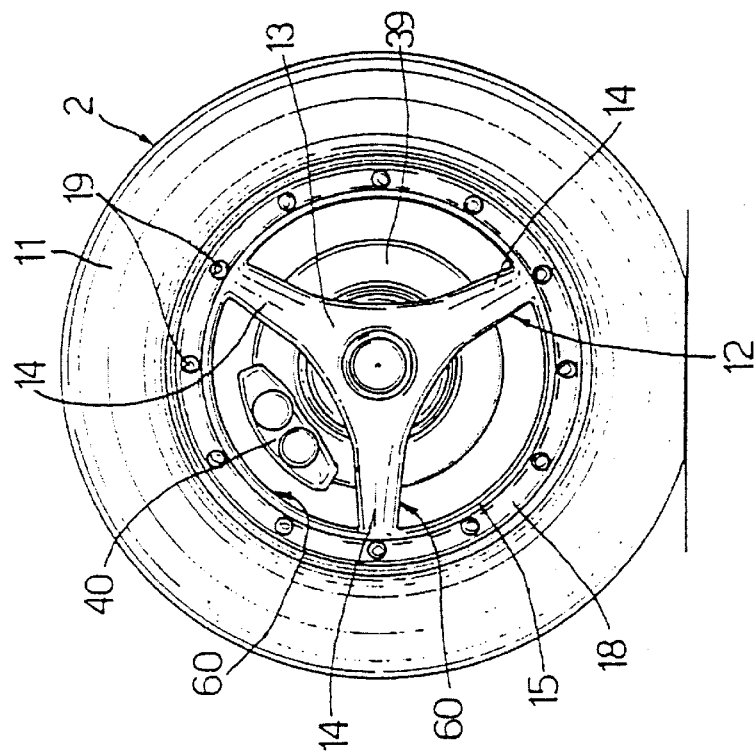
FIG. 2 is a diagrammatic front view, on a reduced scale, and after removal of certain parts, to ensure clarity, of the assembly in FIG. 1.

As illustrated in FIG. 2, flange 12 of wheel 2 includes, between rays 13, empty spaces 60, through which, given the angular dimensions and the axial position of wheel flange 12 with respect to brake group 39, it is possible to access braking member 40, to slide it radially from disc 4 during maintenance or repair.

Brake rotor 4 in brake group 39 could, alternatively, be constructed without any variations to the previously described (resulting in the loss of some of the advantages), by a known type drum element, as opposed to a disc element.

Disc 4 includes internal annular flange 41 presenting radial section 42 around projection 27, in particular, projection 27 defines a cylindric centering seat for the radially internal edge of radial section 42. Moreover, radial section 42 is coupled with screws 43, as illustrated in FIG. 1, directly to central section 13 of flange 12.

Assembly 1 in FIG. 3 differs from assemble 1 in FIG. 2 in terms of the wheel structure, the shape of the wheel hub and the type of coupling used for the wheel flange, the wheel hub and the brake rotor. Constituent parts of assembly 1 similar or identical to parts already described are indicated, for purposes of simplicity, by designated reference numerals.

The wheel, designated with numeral 2', includes rim 44 and wheel flange 45, prepared as independent parts in sheet steel, and coupled with screws 46. The wheel hub, designated by numeral 3', includes, instead of projection 27, annular radial flange 47, defining an axial supporting seat, for respective annular radial section 48 of wheel flange 45. Moreover, other than the base, radial flange 47 also includes step 49, on which is coupled in a secured, angular way, with grooved coupling 50, radial section 42 of disc 4.

Wheel flange 45 includes axial extension annular section 51, with a small diameter, mounted in a secured, angular way with slotted or rotary coupling 52, or with an interference coupling (not illustrated) on cup-shaped body 24. Annular section 51 is also secured axially, as known in the previous case, between supporting seat 28, obtained through plastic deformation of a corresponding edge of wheel hub 3' and supporting seat 47, defined above. Annular section 48 of wheel flange 45, annular flange 47 of hub 3' and radial section 42 of flange 41 are axially block-secured with several rivets, 53, to create an angularly and axially secured and fixed coupling between wheel 2', hub 3'and rotor brake 4.

The block-secured coupling can, (embodiment not illustrated here) be provided with dismountable threaded parts, such as a screw-dice couple (bolt), and wheel flange 12 can be secured, on wheel hub 3 by welding. FIG. 4 illustrates an integrated wheel and wheel hub 12 assembly, an additional embodiment of assembly 1 in FIG. 1. In this case, similar or equal sections or those described previously and indicated for simplicity, designated by numerals.

Assembly 1" includes wheel 2", in his case a driving wheel otherswise identical to wheel 2, and hub 3", fitted onto in known way on slotted propeller shaft 54. Flange 3" differs from flange 3 in that the cup-shaped body presents, between support means 28, sufficient space to contain, axially, central section 13 of wheel flange 12, and radial section 42 of flange 41 of disc 4. More particularly, cup-shaped body 24 presents primary centering cylindrical edge 55, on which is secured, in fixed, angular manner, through slotted or rotary coupling 57, or by way of an interference coupling (not illustrated), central section 13, and secondary cylindrical edge 56, with diameter superior to the preceding one, on which is mounted, in fixed and angular manner, through a second slotted coupling, 58, radial section 42. Sections 13 and 42 are also bloc-secured on supporting seat 27 by way of the plastic deformation of the edge opposite edge wheel hub 3", to create supporting seat 28.

According to aspects described above, in all the embodiments described, the wheel flange is prepared as an independent element both of the rim and of the wheel hub, and is axially and angularly secured in a solid and fixed way to the wheel hub, and can be secured to and separated from the rim. These characteristics guarantee numerous advantages for various types of assembly, part of the present invention.

Firstly, the possibility to dismount the rim-tire assembly from the rest of the wheel, already known for industrial type vehicles, allowing, for instance, faster and easier tire replacement. Moreover, solutions suggested are also valid for wheels with sheet metal components, or components in light alloy, and even make it possible to provide composite wheels with light alloy casted or molded hub and sheet steel rim.

Another advantage is the fact that the brake assembly is protected from wearing. The connection between the dismountable and the fixed section, provided with screws, is distant from the interface with the brake assembly. Consequently, the brake assembly is not subjected to efforts that are inevitably present during the mounting of the dismountable section, due to deformations caused by screw tightening. Embodiments in which the empty flange is star-shaped also make it possible to carry out the final preparation operation of the braking packing, with the brake already assembled on the wheel hub, and, therefore, more accuracy.

Lastly, embodiments proposed allow weight limitations and are less expensive, given that the wheel flange is provided as an independent element, not immediately integrated with the wheel hub, making it possible to fix it to the latter whilst being able to separate it later.

It is clear that changes and variants can be applied to the integrated wheel/wheel hub assembly provided here, without necessarily going beyond the object of the present invention.

What is claimed is:

1. Integrated wheel and wheel hub assembly for a vehicle, both for idler and driving wheels, including a wheel hub, a wheel carried by the wheel hub, a suspension mount to connect the integrated assembly to the vehicle body, a rolling bearing interposed between the said wheel hub and the suspension mount, and a brake rotor; said wheel including a rim for the insertion of a tire and a wheel flange substantially radial, to connect the rim with the wheel hub, wherein:

the wheel flange is provided as an independent element of the rim and of the wheel hub, wherein the assembly comprises angular coupling means interposed between the wheel flange and the wheel hub to be secured axially and angularly in a solid and fixed way to the wheel hub and the wheel flange can be secured in a non fixed way to the rim.

2. Assembly according to claim 1, wherein the angular coupling means include a slotted or rotary coupling.

3. Assembly according to claim 2, wherein the angular coupling means include an interference coupling.

4. Assembly according to claim 2, wherein the angular coupling means include axial coupling means between the wheel flange and the wheel hub.

5. Assembly according to claim 4, wherein the axial coupling means include a primary supporting seat defined by an annular projection of the wheel hub and an annular edge section of the wheel hub deformed by rolling against a radially internal edge of the wheel flange to provide, on contact with the latter, a secondary support rest element, opposite the first.

6. Assembly according to claim 4, wherein said axial coupling means include at least one welding cord, provided between the wheel flange and the wheel hub.

7. Assembly according to claim 5, wherein the assembly includes connection means between the said brake rotor and at least one of the wheel hubs and the wheel flange.

8. Assembly according to claim 1, wherein the wheel flange is provided in light alloy.

9. Assembly according to claim 1, wherein the wheel flange is secured to the rim by way of threaded means.

* * * * *